United States Patent [19]

Millar

[11] Patent Number: 5,292,035

[45] Date of Patent: Mar. 8, 1994

[54] REUSABLE DISPENSING CAP

[76] Inventor: David R. Millar, 162 Stonecliffe Aisle, Irvine, Calif. 92715

[21] Appl. No.: 21,167

[22] Filed: Feb. 22, 1993

[51] Int. Cl.$^5$ .............................................. B67D 5/06
[52] U.S. Cl. .................................. 222/185; 222/525; 222/567
[58] Field of Search ................ 222/151, 184, 185, 522, 222/525, 563, 567, 542, 207, 209, 212, 546; 285/341, 342

[56] References Cited

U.S. PATENT DOCUMENTS

| | | | |
|---|---|---|---|
| 2,363,474 | 11/1944 | Schlesinger | 222/184 |
| 3,131,836 | 5/1964 | Van Baarn | 222/542 |
| 3,216,630 | 11/1965 | Stull | 222/499 |
| 3,326,426 | 6/1967 | Porter et al. | 222/521 |
| 3,777,948 | 12/1973 | Hafele | 222/185 |
| 4,314,656 | 2/1982 | Kessler | 222/525 |
| 4,383,623 | 5/1983 | Page, III | 222/525 |
| 4,516,697 | 5/1985 | Dreps et al. | 222/185 |
| 4,690,304 | 9/1987 | Morel | 222/521 |
| 4,817,831 | 4/1989 | Theisen | 222/525 |
| 4,930,668 | 6/1990 | Krall | 222/185 |
| 4,979,648 | 12/1990 | Montgomery et al. | 222/525 |
| 5,060,830 | 10/1991 | Krall | 222/185 |

Primary Examiner—Andres Kashnikow
Assistant Examiner—Philippe Derakshani
Attorney, Agent, or Firm—Lyon & Lyon

[57] ABSTRACT

An improved dispensing cap for supporting an associated container or bottle in an inverted position. A dispensing cap is provided which comprises a base, a funnel, a compression sleeve, and a seal. The base comprises a supporting flange fixed to a receiving well. The receiving well is adapted to slideably engage the funnel and provides a mechanism for controlling a flow of liquid or gel out of the funnel. The funnel comprises a plurality of flexible flanges mounted to a cap structure. The cap structure has an exterior surface adapted to engage the compression sleeve and an internal surface against which the seal may be disposed. The compression sleeve upon engaging the exterior surface of the cap structure forces the flanges fixed to the cap structure inward, and the flanges, in turn, push the seal inward. In this fashion, the dispensing cap may be adapted to engage not just bottles and containers having spouts of a single, selected diameter, but instead, bottles and containers having spouts of varying sizes and shapes.

3 Claims, 3 Drawing Sheets

REUSABLE DISPENSING CAP

BACKGROUND OF THE INVENTION

The field of the present invention is dispensing caps for containers, and more particularly, reusable dispensing caps which are capable of supporting a container in an inverted position.

It is generally recognized that, to retrieve substantially all of the fluid contained in most bottle-type containers, it is advantageous to support the container in an inverted position for some period of time, as positioning the container in this fashion will allow the contents of the container to settle in the region of the spout or dispensing cap of the container. Unfortunately, because the dispensing caps or spouts of many bottles are smaller in diameter than the bottles with which they are associated, many bottles have a tendency to tip over when placed in an inverted position.

At least one prior art device has been developed in response to the tipping problem. However, as shown in FIGS. 1(a) and 1(b) that device merely comprises a stand wherein a selected dispensing cap can be detachably mounted. It may be noted, however, that for dispensing caps of varying diameters and shapes separate stands are required. Because dispensing cap stands, such as the prior art stand disclosed in FIGS. 1(a) and (b), must be fitted to a particular dispensing cap diameter or shape, their utility is substantially limited.

SUMMARY OF THE INVENTION

The present invention is directed to a dispensing cap which is capable of supporting a wide variety of containers or bottles (i.e. containers and bottles of varying sizes and shapes) in an inverted position. To this end, a dispensing cap in accordance with one form of the present invention comprises a base, a funnel, a compression sleeve, and a seal. The base comprises a supporting flange fixed to a receiving well. The receiving well is adapted to slideably engage the funnel and provides a mechanism for controlling a flow of liquid or gel out of the funnel. The funnel comprises a plurality of flexible flanges mounted to a cap structure. The cap structure has an exterior surface adapted to engage the compression sleeve and an internal surface against which the seal may be disposed. The compression sleeve upon engaging the exterior surface of the cap structure forces the flanges fixed to the cap structure inward, and the flanges, in turn, push the seal inward. In this fashion, a dispensing cap embodying the present invention may be adapted to engage not just bottles and containers having spouts of a single, selected diameter, but instead, bottles and containers having spouts of varying sizes and shapes. Accordingly, as the dispensing cap of the present invention may be utilized with bottles and containers having spouts of numerous sizes and shapes, it is believed that the reusable dispensing cap of the present invention will prove to be highly useful and desirable to both the general public and those in the container industry.

Accordingly, it is an object of the present invention to provide an improved dispensing cap which is capable engaging a wide variety of containers and supporting those containers in an inverted position.

DETAILED DESCRIPTION

Figure 1A:
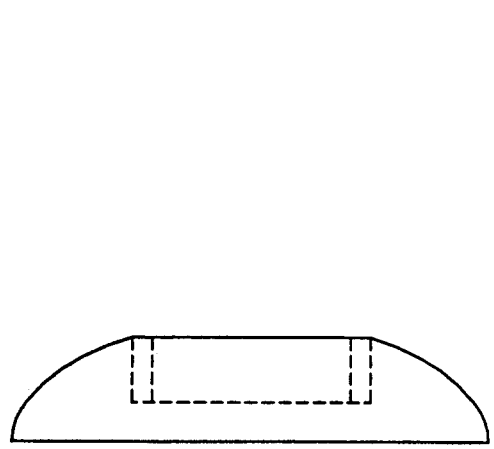
FIG. 1(a) is an illustration of a prior art device for supporting containers or bottles in an inverted position.
Figure 1B:
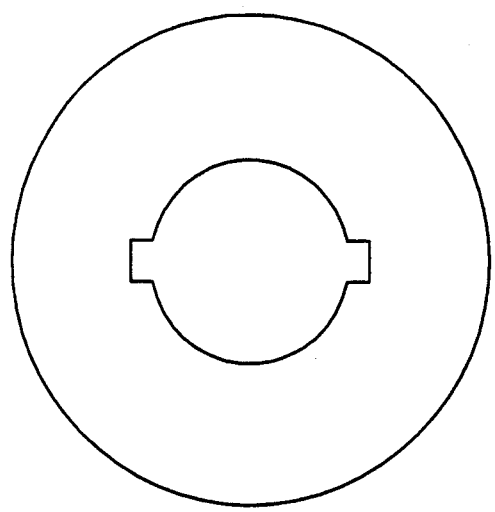
FIG. 1(b) is top view of a prior art device for supporting containers or bottles in an inverted position.
Figure 1C:
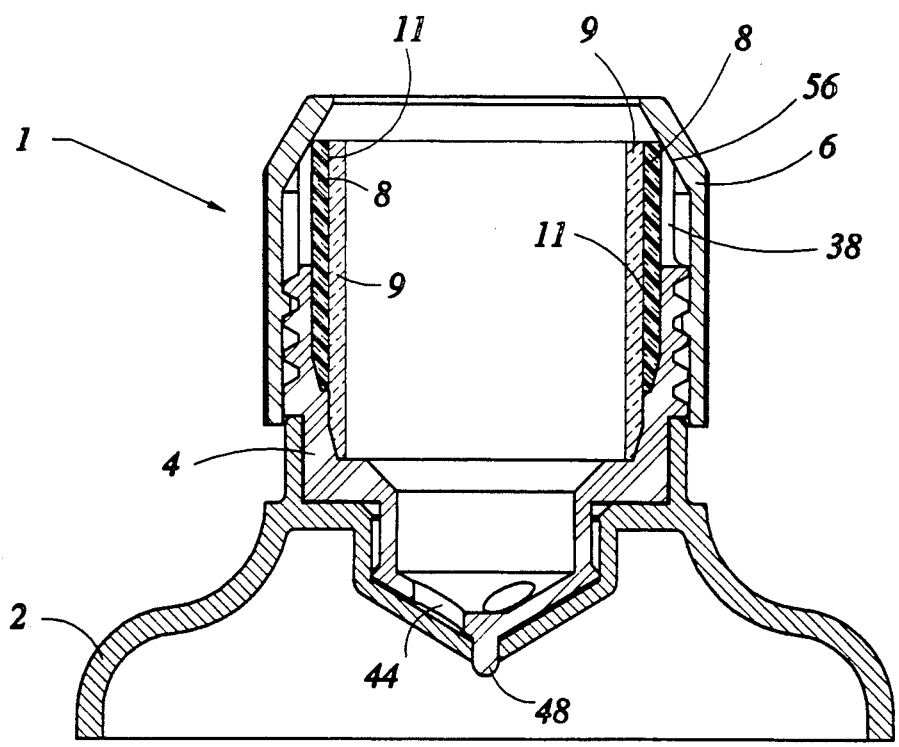
FIG. 1(c) is a cross-sectional assembly view of a dispensing cap in accordance with the present invention.

Turning now to FIG. 1(c), in one form a dispensing cap 1 embodying the present invention comprises a base 2, a funnel 4, a compression sleeve 6, and a seal 8.

Figure 2A:
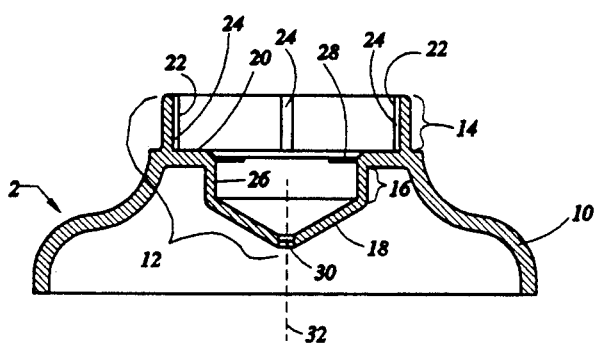
FIG. 2(a) is a cross-sectional view of a dispensing cap base in accordance with the present invention.
Figure 2B:
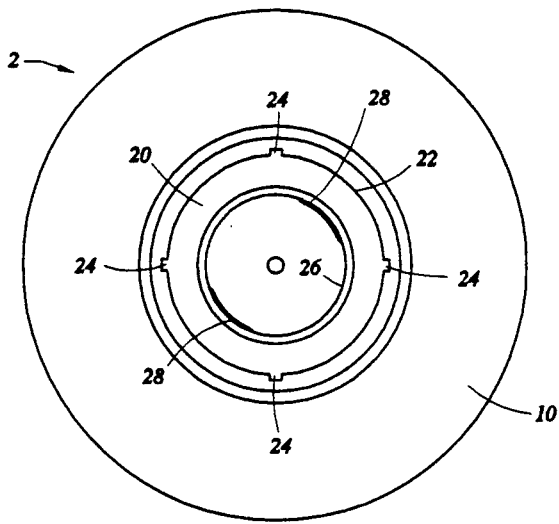
FIG. 2(b) is a top view of a dispensing cap base in accordance with the present invention.

Shown in more detail in FIGS. 2(a) and 2(b), the base 2 comprises an extended flange 10 and a receiving well 12. The extended flange 10 and the receiving well 12 comprise a single structure (i.e. is constructed as a unitary piece using, for example, an injection molding process). As further shown, the receiving well 12 comprises three sections, a first hollow cylindrical section 14, a second hollow cylindrical section 16, and a third conical section 18. The first and second hollow cylindrical sections 14 and 16 are contiguous, and the first hollow cylindrical section 14 has a diameter which exceeds that of the second hollow cylindrical section 16. Moreover, the second hollow cylindrical section 16 may be viewed as an independent reservoir formed in the base 20 of the first hollow cylindrical section 14. Importantly, in a preferred form the inner surface 22 of the first hollow cylindrical section 14 of the receiving well 12 has four equidistantly spaced, recessed grooves 24 formed therein. In addition, it is presently preferred to provide a pair of raised ridges 28 in an upper portion of the inner surface 26 of the second hollow cylindrical section 16. The function of these raised ridges 28 will be discussed more fully below. Finally, the conical section 18 of the receiving well 12 has a small centrally located hole 30 formed therein. More precisely, the centrally located hole 30 is formed along the central axis 32 of the receiving well 12. Thus, a fluid or gel deposited in the receiving well 12 will pass therethrough unless the hole 30 is blocked.

Figure 3A:
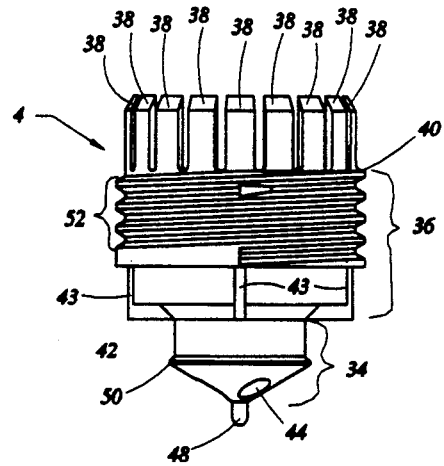
FIG. 3(a) is an illustration of a funnel in accordance with the present invention.
Figure 3B:
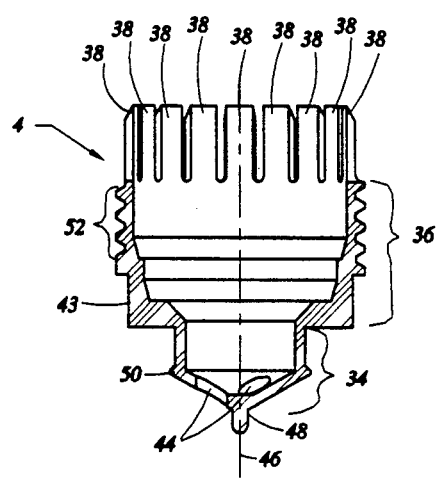
FIG. 3(b) is a cross-sectional view of a funnel in accordance with the present invention.
Figure 3C:
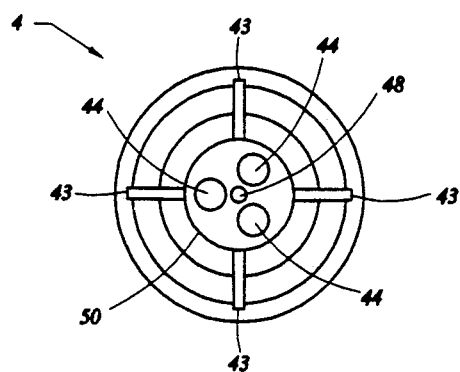
FIG. 3(c) is a bottom view of a funnel in accordance with the present invention.

Turning now to FIGS. 3(a)-3(c), it may be seen that the funnel 4 is formed such that it may mate with and slideably engage the base 2 of the dispensing cap 1. More precisely, the funnel 4 comprises a stem 34, a cap structure 36, and a plurality of flexible flanges 38. The flexible flanges 38 are mounted or fixed to an upper surface 40 of the cap structure 36, and the cap structure 36, in turn, is mounted or fixed to an upper portion 42 of the stem 34. Again, it will be noted by those skilled in the art that the funnel 4 may be constructed as a unitary piece using an injection molding process or other conventional means.

As further shown in FIGS. 3(a) and (c), the cap structure 36 has a plurality of anti-rotation keys 43 formed in its exterior surface. These keys 43 are formed such that they may be received by the recessed grooves 24 formed in the receiving well 12 of the base 2. The interaction of the anti-rotation keys 43 and the recessed grooves 24 allows the funnel 4 to be "screwed" into the compression sleeve 6 by merely turning the base 2 (which is coupled to the funnel 4) and holding the compression sleeve 6 in a fixed position. The interaction between the funnel 4 and the compression sleeve 6 is set forth more fully below.

As in the case of the receiving well 12, the funnel 4 is hollow. Further, in a preferred form a plurality of apertures 44 are formed in the stem 34 and provide a plurality of passages therethrough. The plurality of apertures 44 are disposed vertically through the stem 34 and run parallel to the central axis 46 of the funnel 4. In addition, a thin cylindrical tip 48 is fixed to and extends downward from the stem 34. The tip 48 is formed such that it is capable of mating with the hole 30 formed in the conical portion 18 of the receiving well 12. Thus, when the funnel 4 is inserted to its fullest extent into the receiving well 12, the tip 48 will enter and plug the hole 30. This prevents the flow of liquid through the funnel 4 and base 2.

Figure 4A:
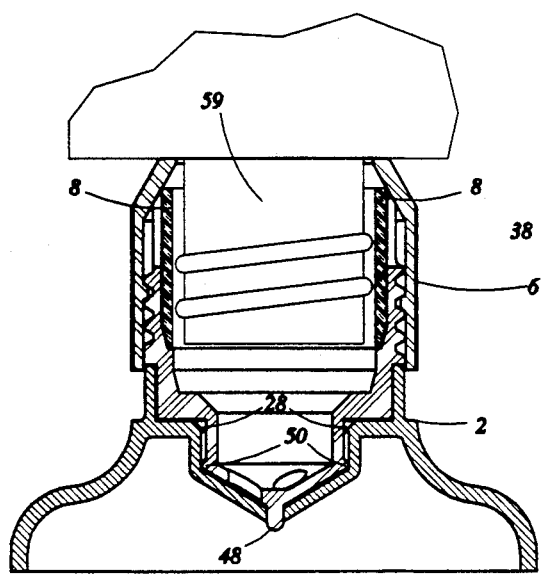
FIG. 4(a) is an assembly cross-sectional view with a bottle inserted into a cap in accordance with the present invention.
Figure 4B:
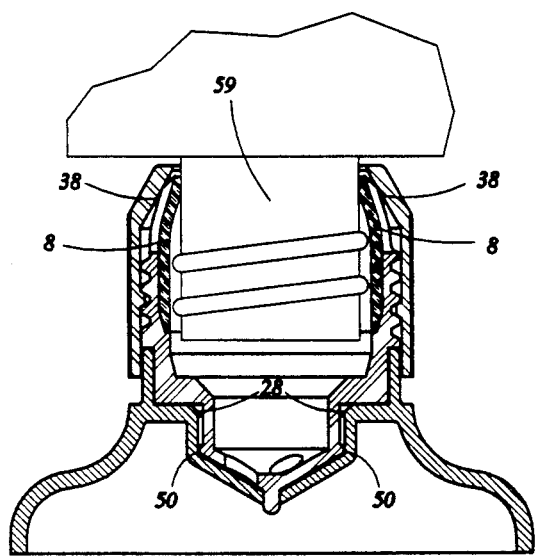
FIG. 4(b) is a cross-sectional assembly view with the compression sleeve funnel and seal compressed against the bottle.
Figure 4C:
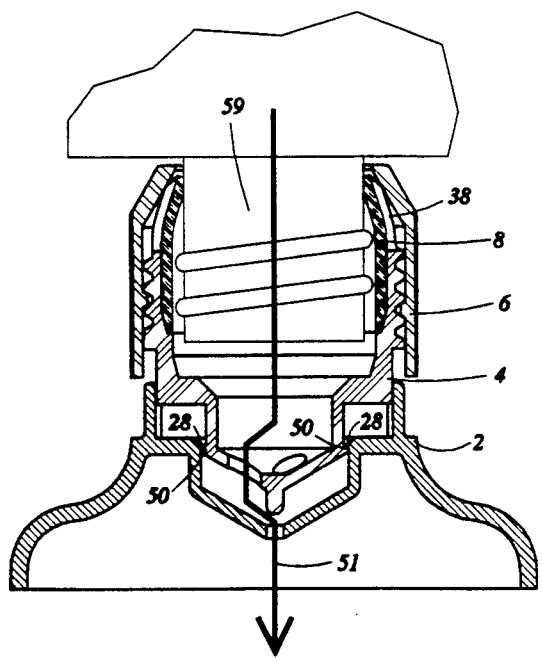
FIG. 4(c) is a cross-sectional assembly view of a cap having an open aperture to permit fluid to dispense in accordance with the present invention.

Turning again to FIG. 3(a), the stem 34 has a raised ridge 50 formed on its exterior surface. The raised ridge 50 is disposed around the entire circumference of a lower portion of the stem 34 and provides a means for engaging the base 2. More specifically, as shown in FIGS. 4(a)-(c), the raised ridge 50 of the funnel 4 and the raised ridges 28 of the base 2 provide a mechanism for slideably coupling the funnel 4 to the base 2. In practice the funnel 4 is "snapped" into the base 2, and once the funnel 4 and base 2 are coupled together, the funnel may slide within a limited range inside the receiving well 12 of the base 2. It should be noted that the funnel 4 must be able to reach a position within the receiving well 12 wherein the tip 48 of the stem 34 is removed from the hole 30 in the conical portion 18 of the receiving well 12, as shown in FIG. 4(c).

Figure 5:
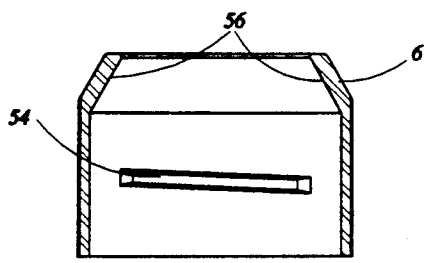
FIG. 5 is a cross-sectional view of a compression sleeve utilized in accordance with the present invention.

Finally, turning to FIGS. 3(a) and 5, a plurality of threads 52 are formed on the exterior of the cap structure 36. The threads 52 are capable of engaging a plurality of threads 54 formed on the interior surface 56 of the compression sleeve 6. Thus, as shown in FIGS. 4(b) and (c), when the compression sleeve 6 is "screwed" onto the funnel 4, the flexible flanges 38 are forced in an inward direction by the inner surface 56 of the compression sleeve 6. As this occurs, the seal 8, which is disposed against the inner surface of the cap structure 36 and the flexible flanges 38, is forced against the spout 59 of an associated container. In this fashion, the dispensing cap 1 of the present invention may be adjusted to fit the spouts of a number of containers (i.e. spouts of varying sizes and shapes).

It is presently preferred to provide a second seal 9, which is disposed against an inner surface 11 of the first seal 8, when coupling the dispensing cap 1 to a container spout having a small diameter (i.e. a spout having a diameter between 0.750" and 0.950"). This is the construction illustrated in FIG. 1(c). However, those skilled in the art will note that the dimensions of the dispensing cap 1 of the present invention are merely a design choice, and that the present invention is applicable to dispensing caps of virtually any size.

To use the dispensing cap 1 of the present invention, it is first necessary to expose the spout of the container to which the dispensing cap 1 is to be coupled. This is performed by simply removing the cap which originally accompanied the container. Next, the compression sleeve 6 of the dispensing cap 1 is loosened to allow the flexible flanges 38 to expand in an outward direction. The spout of the selected bottle is then disposed within the cap structure 36 of the funnel 4, and the compression sleeve 6 is tightened causing the flexible flanges 38 to be forced inward, and the seal 8 (or seals 8 and 9) to be forced against the spout of the container.

Once the dispensing cap 1 is coupled to the container, the dispensing cap 1 may be readied to dispense fluid or gel from within the container by pulling the base 2 in a direction opposite to the container and holding the container in a fixed position. When this takes place, the funnel 4 slides within the receiving well 12 until the raised ridge 50 of the stem 34 engages the raised ridges 28 of the base 2. The dispensing cap 1 is illustrated in this position in FIG. 4(c). The passage of fluid through the dispensing cap 1 is illustrated as line 51.

To dispense the liquid or gel stored within the container, the container may be squeezed to force the liquid through the apertures 44 and the hole 30, of the force of gravity may be used to force the liquid therethrough (depending upon the thickness and consistency of the stored liquid or gel).

To close the dispensing cap 1 the base 2 is urged in the direction of the container until the tip 48 of the stem 34 enters the hole 30 formed in the conical portion 18 of the receiving well 12 of the base 2. The closed position of the dispensing cap 1 is illustrated in FIGS. 1(c) and 4(a) and (b). It may be noted that, because the tip 48 of the stem 34 is disposed in the hole 30 formed in the base 2 after each instance of dispensing the contents of the container, no liquid or gel remains in the hole 30. This eliminates the formation of "hard deposits" within the dispensing passage.

While the invention is susceptible to various modifications and alternative forms, a specific example thereof has been shown by way of example in the drawings and is herein described in detail. It should be understood, however, that it is not intended to limit the invention to the particular form disclosed, but to the contrary, the invention is to cover all modifications, equivalents, and alternatives falling within the scope of the appended claims.

What is claimed is:

1. A dispensing cap for supporting an associated container in an inverted position, said dispensing cap comprising:

a base, a funnel, a compression sleeve, and a seal;

said base comprising a supporting flange fixed to a receiving well, said receiving well being adapted to slideably engage the funnel and providing a mechanism for controlling a flow of liquid out of the funnel;

said funnel comprising a plurality of flexible flanges fixed to an upper surface of a cap structure, said cap structure having an exterior surface adapted to engage said compression sleeve, and said cap structure having an internal surface against which said seal may be disposed;

said compression sleeve upon engaging the exterior surface of said cap structure being capable of forcing said flanges fixed to said cap structure in an inward direction.

2. The dispensing cap of claim 1 wherein said funnel further comprises a cylindrical stem having an exterior surface whereon a first raised ridge is formed, and said receiving well of said base comprises two sections, a first section conforming to and being adapted to slideably pass said cap structure of said funnel, and a second section conforming to and being adapted to slideably pass said cylindrical stem of said funnel, said second section having an interior surface whereon a second raised ridge is formed, said first and second raised ridges providing a mechanism for coupling said funnel to said base.

3. A dispensing cap for supporting an associated container in an inverted position, said dispensing cap comprising:

a base, a funnel, a compression sleeve, and a seal;

said base comprising an extended flange fixed to a receiving well, said receiving well comprising a first hollow cylindrical section, a second hollow cylindrical section, and a third conical section, said first hollow cylindrical section being contiguous with said second hollow cylindrical section, having a diameter exceeding a diameter of said second hollow cylindrical section, and having an inner surface wherein at least one recessed groove is formed, said second hollow cylindrical section having an inner surface whereon at least one raised ridge is formed, and said third conical section having an aperture extending therethrough, said aperture being disposed along a central axis of said conical section of said receiving well;

said funnel comprising a plurality of flexible flanges, a cap structure, and a cylindrical stem, said flexible flanges being fixed to an upper surface of said cap structure, and said cap structure being fixed to an upper surface of said cylindrical stem, said cap structure having an internal surface against which said seal may be disposed and an external surface comprising an upper section and a lower section, said upper section of said external surface being threaded to engage said compression sleeve, and said lower section having at least one anti-rotation key formed thereon, said at least one anti-rotation key being capable of slideably engaging said at least one recessed groove formed in said inner surface of said first cylindrical section of said receiving well, and said cylindrical stem having a second raised ridge extending around its circumference and having a lower surface whereon a tip is mounted, said second raised ridge being capable of engaging said at least one raised ridge of said second cylindrical section of said receiving well to slideably couple said funnel to said base, said tip being dimensioned to mate with said aperture formed in said conical section of said receiving well; and said compression sleeve having an inner surface whereon a second plurality of threads are formed, said second plurality of threads being capable of engaging said first plurality of threads formed on said upper section of said exterior surface of said cap structure, and said compression sleeve when engaging said cap structure being capable of forcing said flexible flanges in an inward direction.

* * * * *